(12) United States Patent
Guzzetta

(10) Patent No.: US 7,984,589 B2
(45) Date of Patent: Jul. 26, 2011

(54) SYSTEM AND METHOD FOR POTTING PLANTS

(75) Inventor: Joanna Guzzetta, Portland, OR (US)

(73) Assignee: Four Seasons Container Gardens LLC, Portland, OR (US)

( * ) Notice: Subject to any disclaimer, the term of this patent is extended or adjusted under 35 U.S.C. 154(b) by 0 days.

(21) Appl. No.: 12/500,004

(22) Filed: Jul. 9, 2009

(65) Prior Publication Data

US 2010/0005717 A1   Jan. 14, 2010

Related U.S. Application Data

(60) Provisional application No. 61/079,784, filed on Jul. 10, 2008.

(51) Int. Cl.
*A01G 9/02* (2006.01)
(52) U.S. Cl. .............................. 47/79; 47/65.6
(58) Field of Classification Search .......... 47/48.5, 47/65.6, 66.7, 75, 79, 80, 81
See application file for complete search history.

(56) References Cited

U.S. PATENT DOCUMENTS

| | | | | |
|---|---|---|---|---|
| 603,492 | A * | 5/1898 | Waterer | 47/65.6 |
| 910,905 | A * | 1/1909 | Clements | 47/80 |
| 1,928,810 | A * | 10/1933 | Burford | 47/80 |
| 1,992,878 | A * | 2/1935 | Muller | 47/80 |
| 2,026,679 | A | 1/1936 | Higgins | |
| 2,231,300 | A * | 2/1941 | Shockney | 47/80 |
| 2,343,010 | A * | 2/1944 | Hebert | 47/79 |
| 2,401,038 | A * | 5/1946 | Barton et al. | 206/217 |
| 2,484,909 | A * | 10/1949 | Ritter | 47/79 |
| 2,514,269 | A * | 7/1950 | Wilberschied | 47/81 |
| 4,149,340 | A * | 4/1979 | DaVitoria-Lobo | 47/79 |
| 4,236,351 | A * | 12/1980 | Smith | 47/79 |
| 4,571,883 | A | 2/1986 | Shaw | |
| 5,448,854 | A | 9/1995 | Hirsch et al. | |
| 6,962,022 | B2 | 11/2005 | Shannon | |
| 7,000,351 | B2 * | 2/2006 | Baumann | 47/80 |

(Continued)

FOREIGN PATENT DOCUMENTS

DE   4343476 A1 *   6/1994   .................. 47/48.5

(Continued)

OTHER PUBLICATIONS

Planter Insert 11", from the Greenhouse Catalog, http://www.greenhousecatalog.com/planter-insert.p.250.html, accessed Jun. 23, 2009.

(Continued)

*Primary Examiner* — Francis T Palo
(74) *Attorney, Agent, or Firm* — Klarquist Sparkman, LLP

(57) ABSTRACT

Embodiments of a system and method for potting plants are disclosed. The system can include a drain shield, a filling material, and a liner for placing between the filling material and a growing medium. In particular embodiments, the filling material comprises expanded polystyrene spheres. The liner is a porous material allowing passage of fluids and preventing passage of substantial amounts of growing medium. The drain shield can include a top wall, at least two supports, at least two bottom walls, and a bottom member having a plurality of openings. The drain shield may include adhesive strips for securing the drain shield to a bottom wall of the container. Also disclosed are embodiments of a method for potting a plant in a container having at least one drain hole in a bottom wall of the container.

5 Claims, 1 Drawing Sheet

U.S. PATENT DOCUMENTS

| | | | |
|---|---|---|---|
| 7,743,554 B2 * | 6/2010 | Morris | 47/65.6 |
| 2008/0028679 A1 | 2/2008 | Anderson et al. | |
| 2009/0013598 A1 * | 1/2009 | Mileto | 47/48.5 |
| 2010/0005717 A1 * | 1/2010 | Guzzetta | 47/65.6 |

FOREIGN PATENT DOCUMENTS

| | | | | |
|---|---|---|---|---|
| FR | 2567361 A1 * | 1/1986 | | 47/65.6 |
| JP | 02261320 A * | 10/1990 | | 47/79 |

OTHER PUBLICATIONS

PotHoles, from The Greenhouse Catalog, http://www.greenhousecatalog.com/potholes-p-672.html, accessed Jun. 23, 2009.

* cited by examiner

SYSTEM AND METHOD FOR POTTING PLANTS

CROSS REFERENCE TO RELATED APPLICATION

This application claims the benefit of the earlier filing date of U.S. Provisional Application No. 61/079,784, filed Jul. 10, 2008, which is incorporated herein by reference.

FIELD

The disclosure pertains to embodiments of a system and method for potting plants.

BACKGROUND

Container gardens comprising containers filled with plants are popular with individuals and businesses. In conventional systems, an empty container is filled with a growing medium, e.g., potting soil, and various plants then are planted in the growing medium. When using large containers, however, several problems typically arise. A large container completely filled with growing medium is very heavy, making it difficult to move the container. Also, the growing medium may block a drain hole in the container, occluding drainage of excess water. Further, roots may penetrate throughout the depth of the growing medium, making it difficult to remove the plants at the end of a growing season. If the container has a top opening that is narrower than the body of the container, it is very difficult to remove a plant if the roots have become entangled in the growing medium, forming a large mass of roots and growing medium. Thus, a need exists for an improved system and method for potting plants in containers.

SUMMARY

Disclosed herein are embodiments of a system and method for potting plants. The system in particular embodiments includes a drain shield configured to be mounted over a drain of a plant container, a filling material for filling space in the container, and a liner for placing between the filling material and a growing medium.

The filling material desirably comprises pieces of a lightweight, water-insoluble, and rigid material. In some embodiments, the material has an outer surface essentially without apertures. In particular embodiments, the material is expanded polystyrene and the pieces are shaped into spheres.

The liner is a porous material. In certain embodiments, the liner allows passage of fluids through the material and prevents passage of substantial amounts of growing medium through the material.

Embodiments of a drain shield are disclosed. The drain shield in the illustrated embodiments includes a top wall, at least two supports to support the top wall spaced above a drain hole in a container. The drain shield also includes at least two bottom walls and a bottom member having a plurality of openings. The top wall, supports, and bottom walls may be constructed from a single piece of material or from separate pieces of material securely fastened together. In particular embodiments, the drain shield has adhesive strips securely attached to the bottom member along the bottom wall, the adhesive strips being suitable for securing the drain shield to a bottom wall of the container.

Also disclosed herein are embodiments of a method for potting a plant in a container having at least one drain hole in a bottom wall of the container. The method comprises placing a drain shield over the drain hole, adding filling material to the container to a desired depth, placing a liner on top of the filling material, adding growing medium to the container on top of the liner to a desired depth, and planting at least one plant in the growing medium. In particular embodiments, the drain shield is adhesively secured to the bottom wall of the container.

DETAILED DESCRIPTION

Described herein are embodiments of a system and method for potting plants. Some embodiments of the system comprise a container having a drain located in the bottom of the container and a drain shield. Particular embodiments further comprise a filling material, a liner, and a growing medium.

Figure 1:
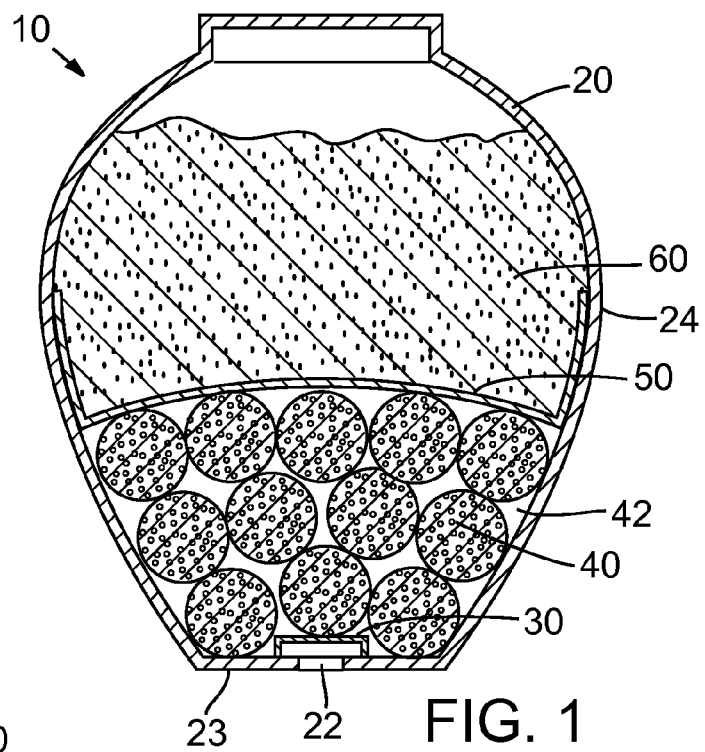
FIG. 1 is a cross-sectional view of an embodiment of a plant container filling system.

FIG. 1 illustrates one embodiment of a plant container filling system 10. The system 10 comprises a container 20, a drain shield 30, a filling material 40, a liner 50, and a growing medium 60. The container 20 can be any container of a suitable material, shape, and size for containing plants. Suitable container materials may include clay, plastic, metal, fiberglass, wood, terra cotta, and concrete, among others. Shapes and sizes of plant containers vary widely as is understood by one of ordinary skill in the art. Desirably the container 20 comprises at least one drain 22 located in a bottom wall 23 of the container 20. The drain 22 allows excess fluids, e.g., water, to exit the container 20.

A drain shield 30 desirably is placed over the drain 22 and is cooperatively dimensioned to cover the drain 22. The drain shield 30 protects against filling material 40, liner 50, growing medium 60, and/or plant roots occluding the drain 22. The drain shield 30 is configured to allow fluids to flow outwardly through the drain 22.

As used herein, filling material is a material other than growing medium. Typically, the filling medium is a non-mineral and/or synthetic material. Growing medium is a substance that is suitable for sustaining the growth and health of one or more plants, e.g., potting soil.

Filling material 40 desirably is placed on top of the drain shield 30 and fills a portion of the container 20 to reduce the amount of growing medium 60 that is used. Typically, filling material 40 comprises a plurality of discrete or separate pieces. The filling material 40 may be any material that is non-harmful to plants and is suitable for occupying space within the container 20. Desirably the material is lightweight, insoluble in water, resistant to deterioration under conditions typically found in plant containers, and rigid enough such that the filling material 40 does not compact or compress under the weight of the growing medium. Additionally, the material desirably has an outer surface essentially free of pores or apertures to minimize or prevent penetration of the filling material 40 by growing medium 60 or plant roots. Filling material 40 can comprise, for example, any of various suitable polymers, such as expanded polystyrene (EPS), polypropylene, polyethylene, acrylic, or polyurethane foam, among others. Alternatively, filling material 40 may be discrete pieces with each piece being substantially hollow and having a solid outer shell (not shown). Suitable materials for the outer shell may include plastics (e.g., polystyrene, polypropylene, polyethylene, acrylic, polyurethane, etc.) or other materials that provide desired properties as discussed above. Although less desirable, non-plastic materials, e.g., metals or glass, also can be used as filling material 40.

Pieces of filling material 40 can have a variety of shapes and sizes. In one embodiment, the filling material 40 can be block-shaped pieces. The blocks may be substantially cube-shaped, rectangular in shape, or irregularly shaped. The block sizes may vary with smaller blocks used in smaller containers and larger blocks useful for larger containers. Also, a combination of different size pieces can be used in the same container.

In another embodiment, the filling material 40 has a substantially spherical shape. The sizes of the spheres may vary depending upon the size of the container 20. For example, the spheres may have a diameter of greater than about 1.5 inches, greater than about 2.5 inches, about 1.5 inches to about 6 inches, about 2.5 inches to about 4 inches, or about 3 inches to about 4 inches. In a particular embodiment, the filling material 40 comprises spheres of EPS having a diameter of approximately 2.5 inches. If the spheres are too small (e.g., less than about 1.5 inches in diameter), they can become entangled with any roots that penetrate into the filling medium 40, thus forming a mass of roots and filling medium 40 that is difficult to subsequently remove from the container 20. Larger spheres, such as those with a diameter of at least 2.5 inches, are separated easily from roots. Spheres that are too small also can pass beneath the drain shield 30 and potentially occlude the drain 22.

The amount of filling material 40 is dependent upon both the size of the container 20 and the type(s) of plants to be planted within the container 20. Space must be left within the container 20 for sufficient growing medium 60. For example, one may wish to plant a tree in a container 20 having a height of about 45 inches. A tree may require, for example, a depth of about 18-21 inches of growing medium 60. Hence, filling material 40 would be placed in the container 20 to a depth of about 24-27 inches. One of ordinary skill in the art understands that other plants may require different depths of growing medium 60 and the depth of filling material 40 can be adjusted accordingly.

A liner 50 desirably is placed on top of the filling material 40. The liner 50 can be any suitable material that allows passage of fluids (e.g., air, water) through the material, but protects against passage of substantial amounts of growing medium 60. Desirably the liner 50 comprises a flexible material. For example, the liner 50 may be a loosely woven fabric or a material with small pores or openings at intervals throughout the material. Exemplary materials may include commercially available landscape fabric as is commonly used for weed and erosion control. The liner 50 may be shaped and sized to substantially conform to the size and shape of the container 20 at the level where the liner 50 is placed. Alternatively, the liner 50 may be larger than the size and shape of the container 20 at the level where the liner 50 is placed, and may extend upwardly for a distance along the inner surface of the container side walls 24, as shown in FIG. 1.

Growing medium 60 is placed on top of the liner 50 within the container 20. The growing medium 60 can be any composition suitable for growing plants. The composition of the growing medium 60 may be determined by the types and varieties of plants selected for the container 20. Exemplary compositions may comprise soil, fertilizer, and/or other components suitable for promoting and sustaining plant growth. The depth of the growing medium 60 is determined by the types and varieties of plants to be planted in the container.

Plant container filling system 10 provides several advantages compared to conventional plant container filling systems. For example, drain shield 30 protects drain hole 22 in the bottom wall 23 of container 20 from blockage by filling material 40, liner 50, growing medium 60, and/or plant roots. Thus, drain shield 30 allows excess fluid, such as water or liquid fertilizer, to flow freely through drain hole 22.

Filling material 40 typically is formed of lightweight material, e.g., EPS, and substantially reduces the overall weight of system 10 compared to a container 20 filled with growing medium 60. In particular embodiments, filling material 40 comprises spheres. A container 20 partially filled with spheres 40 inherently has spaces 42 between individual spheres 40. Spaces 42 permit excess fluids to freely flow downward and out through drain hole 22. The spaces 42 also permit air to diffuse through liner 50 and into growing medium 60, thus exposing plant roots to atmospheric oxygen and providing potential healthful benefits to the plants.

Because container 20 is partially occupied by filling material 40, less growing medium 60 is utilized than if no filling material 40 was present. Additionally, liner 50 separates filling material 40 from growing medium 60. Liner 50, combined with less growing medium 60, facilitates plant root growth within an upper portion of container 20 and minimizes root penetration into filling material 40. Because root growth is substantially maintained within growing medium 60, it is easier to remove plants from container 20 if desired. Liner 50 additionally minimizes growing medium 60 migration into filling material 40.

In an alternate embodiment, the container has no drain hole. Such containers may be desirable for indoor use. If the container does not have a drain hole, a drain shield need not be used. Filling material can be placed directly into the container to the desired depth. The liner is placed on top of the filling material, and growing medium is then placed on top of the liner to the desired depth.

Figure 2:
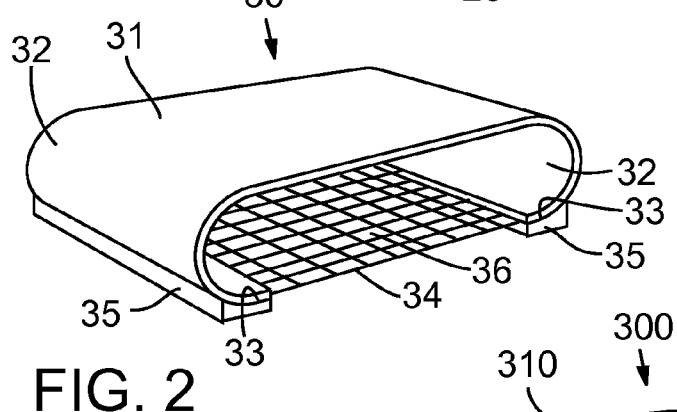
FIG. 2 is a front perspective view of an embodiment of a drain shield.

FIG. 2 is a front perspective view of one embodiment of a drain shield 30. The drain shield 30 is cooperatively dimensioned to cover a drain hole in a container. For example, the drain shield 30 desirably has an overall length and width that are greater than the drain hole so as to completely cover the drain hole from above. The drain shield 30 in the illustrated embodiment comprises a top wall 31, a plurality of side supports or walls 32 extending downwardly from the top wall 31, a plurality of bottom walls 33, a bottom member 34, and adhesive strips 35.

The top wall 31, side walls 32, and bottom walls 33 desirably are comprised of any material that resists damage caused by exposure to moisture and is rigid enough to support the weight of the filling material, growing medium, and the plant(s). Suitable materials may include plastics, such as acrylic, polystyrene, polyethylene, and polypropylene, among others. In particular embodiments, the material utilized to construct the top wall 31, side walls 32, and bottom walls 33 is solid (i.e., having no openings or apertures). In certain embodiments, two side walls 32 are located on opposite sides of the top wall 31 and extend downwardly from the top wall 31. The top wall 31 and side walls 32 define a space between the top wall 31 and the drain hole so as to support the pieces of filling material and growing medium above the drain hole, thereby protecting the drain hole from being occluded by the filling material and/or growing medium. The vertical space between the bottom wall of the container and the drain shield's top wall 31 desirably is less than the overall diameter or size of filling pieces to prevent the filling pieces from migrating under the drain shield 30 and occluding the drain hole.

In some embodiments, the top wall 31, side walls 32, and bottom walls 33 are constructed from a single piece of material, and the material is shaped by any suitable technique or method to form the top wall 31, side walls 32, and bottom walls 33. For example, the material may be a plastic material that is heated until malleable and then shaped. In other embodiments, the top wall 31, side walls 32, and bottom walls 33 may be formed by injection molding of a suitable plastic material. In certain embodiments, the top wall 31, side walls, 32, and bottom walls 33 are constructed from separate pieces of material that are securely fastened together by any suitable method, including fasteners, glue, epoxy, or a suitable solvent, as is known by persons skilled in the art.

A bottom member 34 is securely attached to the bottom walls 33 by any suitable techniques or mechanisms, including, for example, chemical bonding, adhesive bonding, or mechanical fasteners, among others. The bottom member 34 has a plurality of openings 36 through which fluids can pass. The bottom member 34 desirably is constructed of a material that resists damage caused by moisture. In some embodiments, the bottom member 34 is in the form of a screen, mesh, or netting. For example, the bottom member 34 may comprise a plastic-coated cloth netting. Alternatively, the bottom member 34 may comprise a plastic mesh, a metal screen or other suitable porous material that allows passage of fluids Adhesive strips 35 can be securely attached to the bottom member 34 along the extent of the bottom walls 33. The adhesive strips 35 are utilized to securely attach the drain shield 30 to the inner surface of a bottom wall of a container such that the drain shield 30 covers a drain hole in the bottom wall of the container. The adhesive strips 35 may comprise, for example, a double-sided adhesive tape. Desirably the exposed bottom surfaces of the adhesive strips 35 are protected by a removable covering, such as a peelable paper covering (not shown), which is removed when attaching the drain shield to the bottom wall of the container. Other suitable techniques and mechanisms can be used to secure the drain shield 30 to the bottom wall of the container. For example, the drain shield 30 can be adapted to receive mechanical fasteners, such as clips or bolts that secure the drain shield 30 to the bottom wall of the container.

In another embodiment, hook-and-loop tape (e.g., VELCRO®) is used in place of adhesive strips 35. Desirably, the hook-and-loop tape has an adhesive backing protected by a removable covering, which is removed when attaching the hook-and-loop tape to the bottom walls of the drain shield and the bottom wall of the container. For example, the adhesive backing of the hook portion of the hook-and-loop tape may be adhered to the bottom walls of the drain shield, and the adhesive backing of the loop portion of the hook-and-loop tape may be adhered to the bottom wall of the container. Alternatively, the loop portion may be adhered to the bottom walls of the drain shield, and the hook portion may be adhered to the bottom wall of the container.

Figure 3:
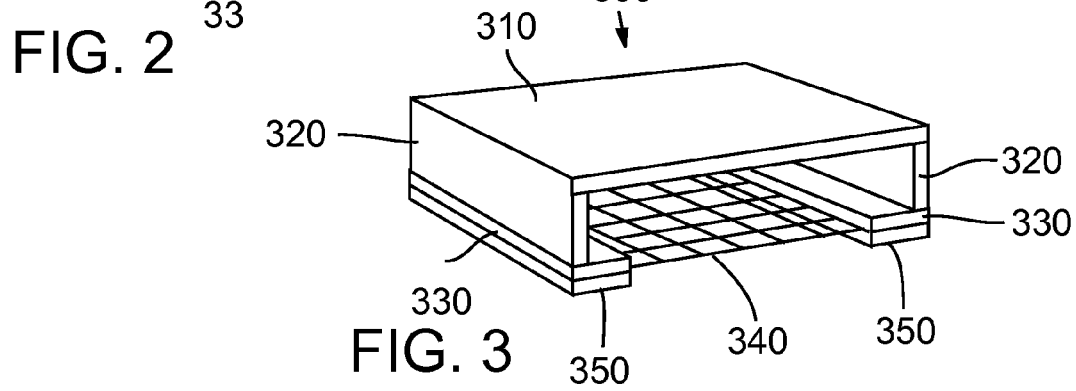
FIG. 3 is a front perspective view of an alternate embodiment of a drain shield.

The side walls 32 illustrated in FIG. 2 have a curved configuration. FIG. 3 illustrates an alternative embodiment of a drain shield 300 having a top wall 310, side walls 320, bottom walls 330, a bottom member 340, and adhesive means 350. In this embodiment, the side walls 330 form 90-degree corners with the top and bottom walls 310, 330.

Embodiments of a method for filling a plant container using the described system comprise the following steps. A container having at least one drain hole in the bottom wall of the container is selected based upon the preferences of the user and the number, types and varieties of plants to be used. A drain shield is placed over the drain hole and optionally securely attached using the drain shield's adhesive strips. The preferred depths of the filling material and growing medium are determined based upon the height of the container and types and varieties of plants selected. Filling material is added to the container until the determined filling material depth is reached. A liner is then placed into the container on top of the filling material. Desirably the liner completely covers the top surface of the filling material. The liner may extend at least partially up the inner surface of the container's side walls. Growing medium is then added to the container on top of the liner until the determined depth of the growth medium is reached. The selected plants are then planted in the growing medium. The plants are watered, and optionally fertilized, to encourage and maintain healthy growth of the plants.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

We claim:

1. A drain shield for shielding a drain hole of a container, comprising:
    a top wall having an upper surface and a lower surface;
    at least two supports extending downwardly from the top wall to support the top wall in a spaced relationship above the drain hole;
    at least two bottom walls;
    a bottom member, the bottom member being securely attached to the bottom walls and having a plurality of openings allowing passage of fluids through the bottom member; and
    adhesive strips securely attached to the bottom member along the bottom walls for adhesively securing the drain shield to a bottom wall of a container.

2. The drain shield of claim 1 where the top wall, the supports, and the bottom walls are comprised of a rigid material.

3. The drain shield of claim 1 where the top wall, the supports, and the bottom walls are constructed from a single piece of the rigid material.

4. A method for potting a plant in a container, comprising:
    placing a drain shield over a drain hole in a bottom wall of the container before adding a filling material to the container, wherein the drain shield comprises one or more adhesive strips;
    adhesively securing the drain shield to the bottom wall of the container with the one or more adhesive strips;
    adding filling material to the container to a desired depth;
    placing a liner on top of the filling material;
    adding growing medium to the container on top of the liner to a desired depth; and
    planting at least one plant in the growing medium.

5. The method of claim 4 where the filling material comprises a plurality of spheres.

* * * * *